(12) United States Patent
Schubert et al.

(10) Patent No.: US 7,440,395 B2
(45) Date of Patent: Oct. 21, 2008

(54) TELECOMMUNICATION SWITCH AND OPERATING METHOD

(75) Inventors: Rolf Schubert, Vaihingen (DE); Hartmut Schmidt, Grossbottwar (DE)

(73) Assignee: ALCATEL, Paris (FR)

( * ) Notice: Subject to any disclaimer, the term of this patent is extended or adjusted under 35 U.S.C. 154(b) by 531 days.

(21) Appl. No.: 11/059,438

(22) Filed: Feb. 17, 2005

(65) Prior Publication Data

US 2005/0201298 A1  Sep. 15, 2005

(30) Foreign Application Priority Data

Mar. 9, 2004  (EP)  .................. 04360026

(51) Int. Cl.
*H04J 14/00*  (2006.01)
(52) U.S. Cl. .......................... 370/219; 398/2
(58) Field of Classification Search ......... 370/216–228; 398/1–5; 714/2
See application file for complete search history.

(56) References Cited

U.S. PATENT DOCUMENTS

| | | | | |
|---|---|---|---|---|
| 5,321,394 A | * | 6/1994 | Carlton et al. | ......... 340/825.01 |
| 6,088,329 A | * | 7/2000 | Lindberg et al. | ............ 370/217 |
| 6,690,644 B1 | | 2/2004 | Gorshe | |
| 6,999,410 B2 | * | 2/2006 | Spaenjers et al. | ........... 370/219 |
| 2003/0043734 A1 | | 3/2003 | Takeguchi | |
| 2003/0133405 A1 | * | 7/2003 | Blorec et al. | ................ 370/218 |

* cited by examiner

*Primary Examiner*—Huy D. Vu
*Assistant Examiner*—Alex Skripnikov
(74) *Attorney, Agent, or Firm*—Sughrue Mion, PLLC

(57) ABSTRACT

A telecommunication switch and an operating method for handling SDH signals transmitted by a protection SDH link associated to a working SDH link of an SDH hardware interface of the telecommunication switch. The telecommunication switch comprises a plurality of SDH hardware interfaces and an equipment protection arrangement. Each of the SDH hardware interfaces is connected to the equipment protection arrangement by a first and a second SDH connection. A protection SDH link of a first SDH hardware interface is connected to a second SDH hardware interface. The second SDH hardware interface is designed to forward protection SDH signals transmitted by the protection SDH link to the equipment protection arrangement using its first SDH connection. The equipment protection arrangement switches the protection SDH signals to a spare SDH termination module or an SDH termination module connected to the first SDH hardware interface according to a protection switching control signal.

5 Claims, 3 Drawing Sheets

TELECOMMUNICATION SWITCH AND OPERATING METHOD

The invention is based on a priority application EP 04360026.1 which is hereby incorporated by reference.

BACKGROUND OF THE INVENTION

This invention relates to a telecommunication switch to be used in public switching telephony networks, comprising a plurality of Synchronous Digital Hierarchy (SDH) hardware interfaces, each comprising-working link connecting means, being designed to be connected to a working SDH link and protection link connecting means, being designed to be connected to a protection SDH link associated to the working SDH link of the SDH hardware interface, wherein to each of said SDH hardware interfaces a SDH termination module is connected and an operating method for handling SDH signals transmitted by a protection SDH link associated to a working SDH link of a SDH hardware interface of a telecommunication switch according to the invention.

SDH is an international digital telecommunications network hierarchy which standardises transmission around the bit rate of 51.84 megabits per second, which is also called STS-1. Multiples of this bit rate comprise higher bit rate streams. Thus STS-3 is 3 times STS-1, STS-12 is 12 times STS-1, and so on. STS-3 is the lowest bit rate expected to carry ATM traffic, and is also referred to as Synchronous Transport Module-Level 1 (STM-1).

A working SDH link (primary link) is defined as a default link for transferring data (working SDH signals) to be switched by the telecommunication switch. A protection link (secondary link) is defined as a link for transferring the data (protection SDH signals) to be switched by the telecommunication switch in case of a failure occurring on the primary link. Primary and secondary link may be implemented as an electrical and/or an optical data transmission connection. A telecommunication switch is equipped with means for switching (protection switching) data received from the primary and the secondary link to spare hardware elements in case of failure of a hardware element, e.g. a SDH hardware interface (applique) and/or a SDH termination module, used for switching the data. These means are called Equipment Protection Switching (EPS) means or equipment protection arrangement. An applique is used for switching data transmitted by SDH links according to a destination of the data. According to known physical reasons each SDH link has to be connected to a SDH termination module. Therefore a SDH termination module is connected to each applique.

According to the state of the art, a separate equipment protection switch, using extra space in a rack, wherein the hardware modules of a telecommunication switch are positioned, is used to switch SDH links, meaning working and/or protection link, from an active to a spare termination equipment. Each equipment protection switch is associated to a group (protection group) of a number N of SDH hardware interfaces and SDH termination modules. Different solutions are used for equipment protection switching, depending on whether electrical or optical transmission connections are used.

Separate equipment protection switches for optical and electrical SDH links are used. Therefore several slot positions in a rack per protection group (space) for a dedicated equipment protection switch are needed. Furthermore, the effort for hardware elements to be used for protection switching is high.

SUMMARY OF THE INVENTION

It is therefore an object of the invention to provide a telecommunication switch and an operating method for handling SDH signals transmitted by a protection SDH link of the telecommunication switch which overcome the problems associated with the related art, in particular which reduce the hardware effort used for protection switching.

The object concerning the telecommunication switch is attained by the telecommunication switch comprising
 a plurality of SDH hardware interfaces, each comprising working link connecting means, being designed to be connected to a working SDH link and protection link connecting means, being designed to be connected to a protection SDH link associated to the working SDH link of the SDH hardware interface, wherein to each of said SDH hardware interfaces a SDH termination module is connected, and
 an equipment protection arrangement, comprising a protection switching hardware module and a spare SDH termination module, wherein
 each of said SDH hardware interfaces is connected to said equipment protection arrangement by a first SDH connection and a second SDH connection, and the protection SDH link of a first SDH hardware interface of said SDH hardware interfaces is connected to a second SDH hardware interface of said SDH hardware interfaces,
 the second SDH hardware interface is being designed to forward protection SDH signals transmitted by said protection SDH link of said first SDH hardware interface to said equipment protection arrangement using its first SDH connection and
 said equipment protection arrangement is being designed to switch said protection SDH signals to said spare SDH termination module or the SDH termination module being connected to said first SDH hardware interface according to a protection switching control signal.

1. The object concerning an operating method for handling SDH signals transmitted by a protection SDH link of the telecommunication switch is attained by the method for handling protection SDH signals transmitted by a protection SDH link associated to a working SDH link of a first SDH hardware interface of a telecommunication switch according to claim 1, comprising the steps of
 receiving said protection SDH signals by a second SDH hardware interface of said telecommunication switch,
 forwarding said protection SDH signals by said second SDH hardware interface to an equipment protection arrangement by using a first SDH connection of said second SDH hardware interface to said equipment protection arrangement,
 switching said protection SDH signals by said equipment protection arrangement to a spare SDH termination module of said equipment protection arrangement or to a SDH termination module being connected to said first SDH hardware interface according to a protection switching control signal.

Further advantageous features of the invention are defined in the depending claims.

The inventive telecommunication switch is comprising:
 a plurality of SDH hardware interfaces (protection group), each comprising working link connecting means, being designed to be connected to a working SDH link and protection link connecting means, being designed to be connected to a protection SDH link associated to the working SDH link of the SDH hardware interface, wherein to each of said SDH hardware interfaces a SDH termination module is connected, and an equipment protection arrangement, comprising a protection switching hardware module and a spare SDH termination module.

According to the invention each of said SDH hardware interfaces is connected to said equipment protection arrangement by a first SDH connection and a second SDH connection, and the protection SDH link of a first SDH hardware interface of said SDH hardware interfaces is connected to a second SDH hardware interface of said SDH hardware interfaces. The second SDH hardware interface is being designed to forward protection SDH signals transmitted by said protection SDH link of said first SDH hardware interface to said equipment protection arrangement using its first SDH connection. Said equipment protection arrangement is being designed to switch said protection SDH signals to said spare SDH termination module or the SDH termination module being connected to said first SDH hardware interface according to a protection switching control signal. The protection switching control signal may be derived from a protection control bus (backplane) connecting the hardware elements, meaning the protection group, the connected SDH termination modules and the equipment protection arrangement. A decision is made, whether to switch the protection SDH signals to the spare SDH termination module or the SDH termination module. If the SDH termination module or the SDH hardware interface involved into the switching of the protection SDH signals fails, the signals will be switched to the spare SDH termination module otherwise the protection SDH signals will be switched to the SDH termination module using a SDH connection, which connects the equipment protection arrangement and the SDH termination module directly or indirectly, meaning having another hardware module in-between.

The inventive telecommunication switch results at least in the following advantages:

There is no extra space needed for a dedicated equipment protection switch.

Equipment protection switching is applicable for electrical and optical SDH terminations using the same Equipment Protection Switching hardware.

Electrical and optical SDH terminations can be mixed simultaneously in the same Equipment Protection Switching section, meaning the some protection group.

Flexible grouping of N appliques for protection switching, with N starts, meaning SDH hardware modules with each having a SDH termination module connected, at only one to many, meaning only one spare SDH termination module to be connected to the protection group (N:1 protection switching).

The inventive telecommunication switch results in an Automatic Protection Switching (APS), meaning any incoming data from any secondary link and additionally from any primary link connected to the protection group is switched automatically to a SDH termination module without having a failure.

In case of an applique failure, APS and EPS are both initiated. This can be decoupled, if the backplane is used to carry the protecting link information to the working terminating SDH module, meaning if the backplane is used to transmit the protection SDH signals from the equipment protection arrangement to the working terminating SDH module.

Preferably, said equipment protection arrangement is being designed to forward said protection SDH signals to said first SDH hardware interface using the second SDH connection of said first SDH hardware interface. In this preferred embodiment of the invention there is an indirect connection between the equipment protection arrangement and the SDH termination module. Advantageously, an existing connection between the SDH termination module and the SDH hardware interface is used to forward the protection SDH signals to the SDH termination module if no failure has occurred. Therefore existing standard SDH termination modules having no supplementary connection can be used.

In a further very advantageous embodiment of the invention said equipment protection arrangement of the inventive telecommunication switch is comprising a primary connecting link and a secondary connecting link, both connecting said protection switching hardware module and said spare SDH termination module, wherein said equipment protection arrangement is being designed to forward said protection SDH signals from said protection switching hardware module to said spare SDH termination module using said secondary connecting link and said first SDH hardware interface is being designed to forward working SDH signals transmitted by said working SDH link of said first SDH hardware interface to said equipment protection arrangement. Furthermore, said equipment protection arrangement is being designed to forward said working SDH signals from said protection switching hardware module to said spare SDH termination module using said primary connecting link. In case of an implementation of the inventive telecommunication switch according to this preferred embodiment, both received signals, the protection SDH signals and the working SDH signals, can be switched to the spare SDH termination module in case of a failure which has occurred in a SDH termination module of an applique connected to the links, which transmit the signals. This results in an Automatic Protection Switching.

Preferably, said protection switching hardware module is located in a rear position of said spare SDH termination module. Advantageously, in this case no slot position is occupied in the rack of the inventive telecommunication switch by the protection switching hardware module.

Preferably, said protection switching hardware module is comprising a signal converter connected to said SDH hardware interfaces by a protection control bus, said signal converter being designed to switch control signals exchanged by said protection switching hardware module and said SDH termination modules on said protection control bus. Because of the signal converter, no supplementary hardware module is necessary to control the switching of the SDH signals. Also the decision how to switch and where to forward the different SDH signals according to a protection switching control signal may be made by the signal converter.

If said SDH termination modules connected to said SDH hardware interfaces are comprising electrical SDH termination modules and optical SDH termination modules, both kind of signals, electrical and optical signals, transmitted by SDH links connected to the telecommunication switch can be switched according to their destination.

The inventive method for handling protection SDH signals transmitted by a protection SDH link associated to a working SDH link of a first SDH hardware interface of a telecommunication switch according to the invention is comprising the steps of:

receiving said protection SDH signals by a second SDH hardware interface of said telecommunication switch, forwarding said protection SDH signals by said second SDH hardware interface to an equipment protection arrangement by using a first SDH connection of said second SDH hardware interface to said equipment protection arrangement, switching said protection SDH signals by said equipment protection arrangement to a spare SDH termination module of said equipment protection arrangement or to a SDH termination module being connected to said first SDH hardware interface according to a protection switching control signal.

If no failure has occurred the protection SDH signals are being switched to the SDH termination module of the SDH hardware interface the protection SDH link belongs to. In case of a failure of this SDH hardware interface or its SDH termination module, the protection SDH signals are switched to the spare SDH termination module.

The inventive method is to be used to handle protection SDH signals to be switched by an inventive telecommunication switch. Therefore, it provides the advantages of the inventive telecommunication switch.

Preferably, said switching of said protection SDH signals to said SDH termination module being connected to said first SDH hardware interface is being carried out by forwarding said protection SDH signals from said equipment protection arrangement to said first SDH hardware interface by using a connection between said equipment protection arrangement and a second SDH connection of said first SDH hardware interface and forwarding said protection SDH signals from said first SDH hardware interface to said SDH termination module being connected to said first SDH hardware interface. This preferred method is used to forward protection SDH signals from the equipment protection arrangement to the SDH termination module in case of an indirect connection.

In case that also working SDH signals are to be handled by the inventive telecommunication switch in case of a failure of a SDH termination module, said switching of said protection SDH signals to said spare SDH termination module is being carried out by forwarding said protection SDH signals from a protection switching hardware module of said equipment protection arrangement to said spare SDH termination module by using a secondary connecting link between said protection switching hardware module and said spare SDH termination module and working SDH signals transmitted by said working SDH link of said first SDH hardware interface are forwarded to said equipment protection arrangement by said first SDH hardware interface. Furthermore, said working SDH signals are forwarded from said protection switching hardware module to said spare SDH termination module using a primary connecting link between said protection switching hardware module and said spare SDH termination module. So both received signals, the protection SDH signals and the working SDH signals, can be switched to the spare SDH termination module in case of a failure, which has occurred in a SDH termination module of an applique connected to the links which transmit the signals. This results in an Equipment Protection Switching.

Advantageously, the inventive telecommunication switch, preferably said equipment protection arrangement is comprising at least one microcomputer loaded with a computer program with software code sections by which the switching of control signals on said protection control bus is controlled to carry out the inventive method. To implement the inventive method as a computer program is the most appropriate way to achieve the advantages of the inventive method.

The different features of the preferred embodiments of the invention may be used in combination together with the invention as set forth in the independent claims or just each single preferred embodiment together with the invention as set forth in the independent claims.

BRIEF DESCRIPTION OF THE DRAWINGS

The embodiments of the invention will now be described with reference to the accompanying drawings.

DETAILED DESCRIPTION OF THE DRAWINGS

Figure 1:
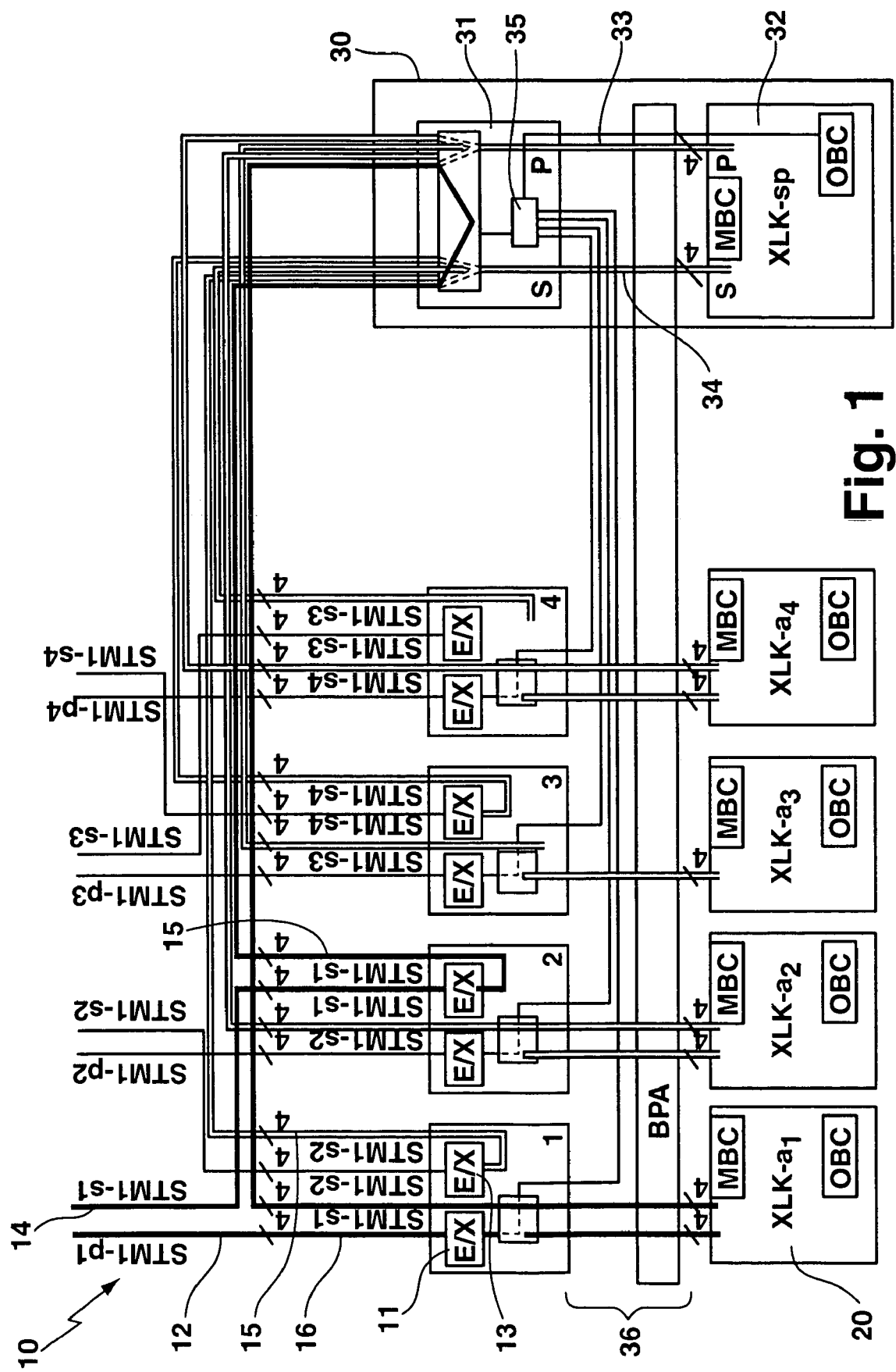
In FIG. 1 the inventive telecommunication switch (embedded equipment protection switch) is shown, wherein the SDH connections used to forward protection SDH signals of a SDH hardware interface in case of default routing, when no failure has occurred, are pointed out.

In FIG. 1 the inventive telecommunication switch 10 comprising a plurality of SDH termination modules (electrical and/or optical) and a plurality of appliques 1,2,3,4, meaning hardware interfaces for connecting the telecommunication switch to SDH links 12, 14, allocated to said SDH terminations is shown. The SDH connections 12,14 used to forward protection SDH signals or working SDH signals of a SDH hardware interface 1 in case of default routing, when no failure has occurred are shown as thick black lines.

The telecommunication switch 10 is comprising an equipment protection arrangement 30 comprising at least a protection switching hardware module 31 (protection applique) and a spare SDH termination module 32. A working SDH link 12 is connected to the applique 1 of a working SDH termination module 20 and the protection SDH link 14 associated to this working SDH link 12 is connected to the applique 2 of another SDH termination module, from which the protection SDH signals transmitted by the protecting SDH link 14 is forwarded to the protection applique 31 and back to said applique 1 of the working SDH termination 20. The protection switching hardware module 31 is further comprising a signal converter (SC) 35, which is designed to switch control signals for each SDH termination module and the protection applique 31 itself. The signal converter 35 is connected preferably by coax cable links to each applique 1,2,3,4 and the spare SDH termination module 32 via a protection control bus 36. Also the working SDH links (STM1-pn, wherein n is a number between 1 and 4) and the protection SDH links (STM1-sn, wherein n is a number between 1 and 4) are connected to the appliques by coax cables. The invention is not restricted to STM1 SDH links. It may also be applied, e.g. to STM4, STM16 and/or OC3 SDH links. The Protection Control Bus 36 is part of the Back Panel Assembly (BPA) of the telecommunication switch 10. The protection applique 31 is connected to the spare SDH termination module 32 by a primary connecting link (p) 33 and a secondary connecting link (s) 34. Each SDH hardware interface 1,2,3,4 is connected to the protection application 31 of the equipment protection arrangement 30 by a first SDH connection 15 and a second SDH connection 16. Both, the first SDH connection and the second SDH connection are implemented as SDH links via wire pairs. The appliques are comprising working link connection means 11 and protection link connecting means 13, both marked E/x in the figure. E/x stands for either "Electrical to Optical Converter" (E/O) or "Electrical to Electrical Converter" (E/E). In practice, E/O is a fiber transceiver and E/E is a magnetic transformer. Each of the active SDH termination modules (XLK-an, wherein n is a number between 1 and 4) and the spare SDH termination module 32 is comprising a Mounted Board Converter (MBC) and an On Board Controller (OBC). The shown telecommunication switch is able to perform an Embedded Equipment Protection Switching (EPS) for optical and electrical SDH Termination Equipment. This results in the provision of N:1 Equipment Protection Switching with flexible usage of slots in the rack of the telecommunication switch and optimized usage of available space. No other equipment space has to be used than that for active and spare termination equipment. The same equipment protection system for optical and electrical SDH terminations can be used. Thus, an Equipment Protection Switch (EPS) is distributed over the appliques of the SDH terminating modules. Each working SDH link (according to Automatic Protection Switching) is connected to the applique (first SDH hardware interface) of a working SDH termination module and each protecting SDH link is connected to another applique (second SDH hardware interface) of another SDH termination module. On the second SDH hardware interface, an electrical signal is linked to the first SDH hardware interface (working applique) over a protection applique, which is located in the rear position of the spare SDH termination module. As shown in FIG. 1, the working SDH link is connected via the first SDH hardware interface (XLK applique) to the associated SDH termination module (XLK-$a_n$). The protected SDH link is connected to another applique (second SDH hardware interface) of another SDH termination module (XLK-$a_{n+1}$). On the second SDH hardware interface, the protection SDH signal is forwarded to the protection applique connected to the spare SDH termination module (XLK-sp). Here the protection SDH signal is forwarded to the same applique (first SDH hardware interface) and SDH termination module as the working SDH signal transmitted on the working SDH link. This describes the normal operating mode.

Figure 2:
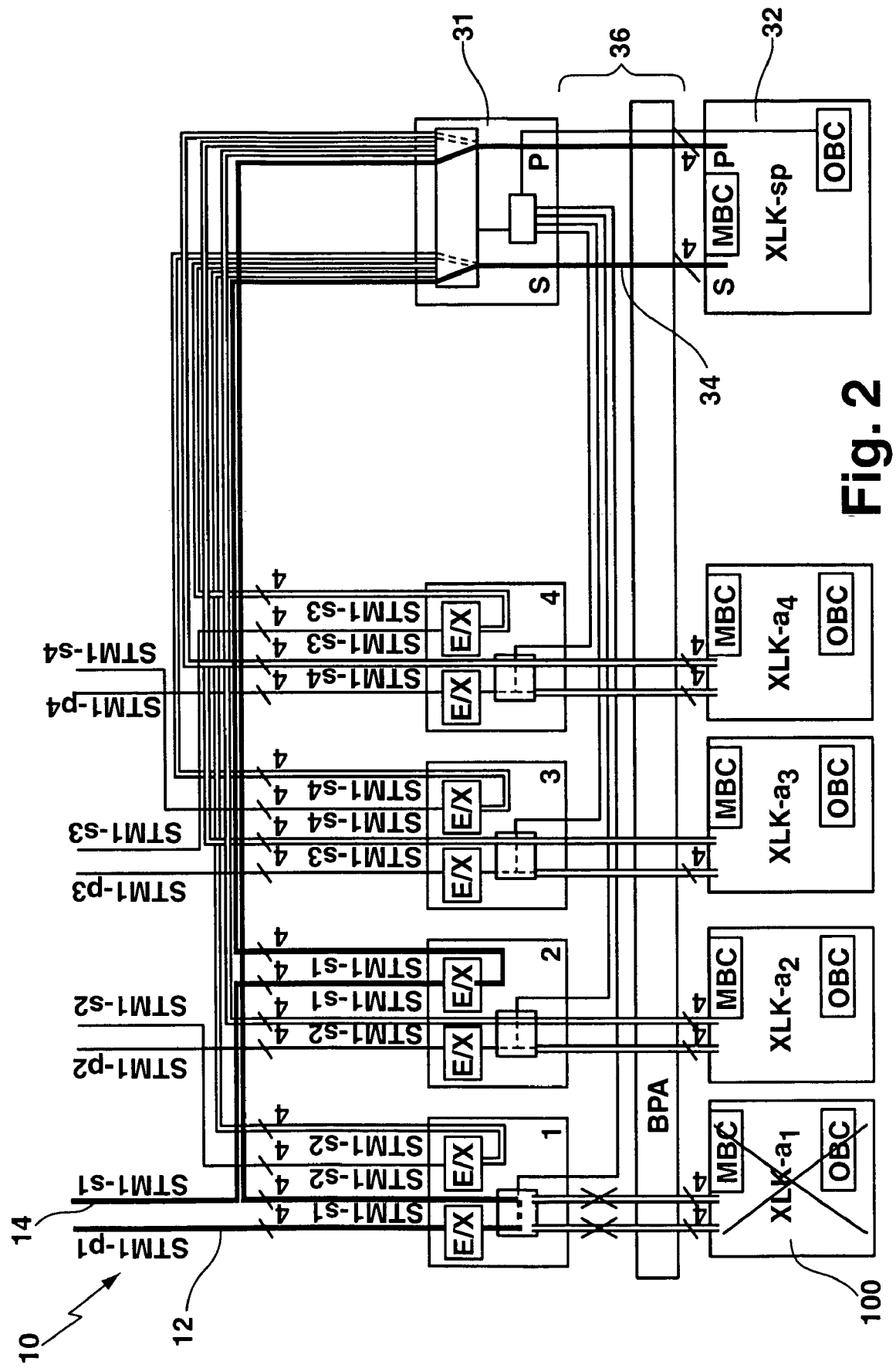
In FIG. 2 the protection routing of protection SDH signals and working SDH signals in case of a failure of a working SDH termination module is shown.

In FIG. 2 the signal routing in case of a failure of the SDH termination module (XLK-a) 100 is shown. The SDH connections used to forward protection SDH signals or working SDH signals of a SDH hardware interface in case a failure of the SDH termination module are shown as thick black lines.

In this case, the spare SDH termination module (XLK-sp) has to take over the functionality of the failed SDH termination module. This implies, that the signal of the working SDH link is switched from the applique of the failed module to the protection applique (XLK-sp applique) and from the protection applique to the spare SDH termination module. In this case, the signals transmitted on both links, the protection SDH signal and the working SDH signal, are switched on the XLK-sp applique and to the spare terminating module (XLK-sp).

Figure 3:
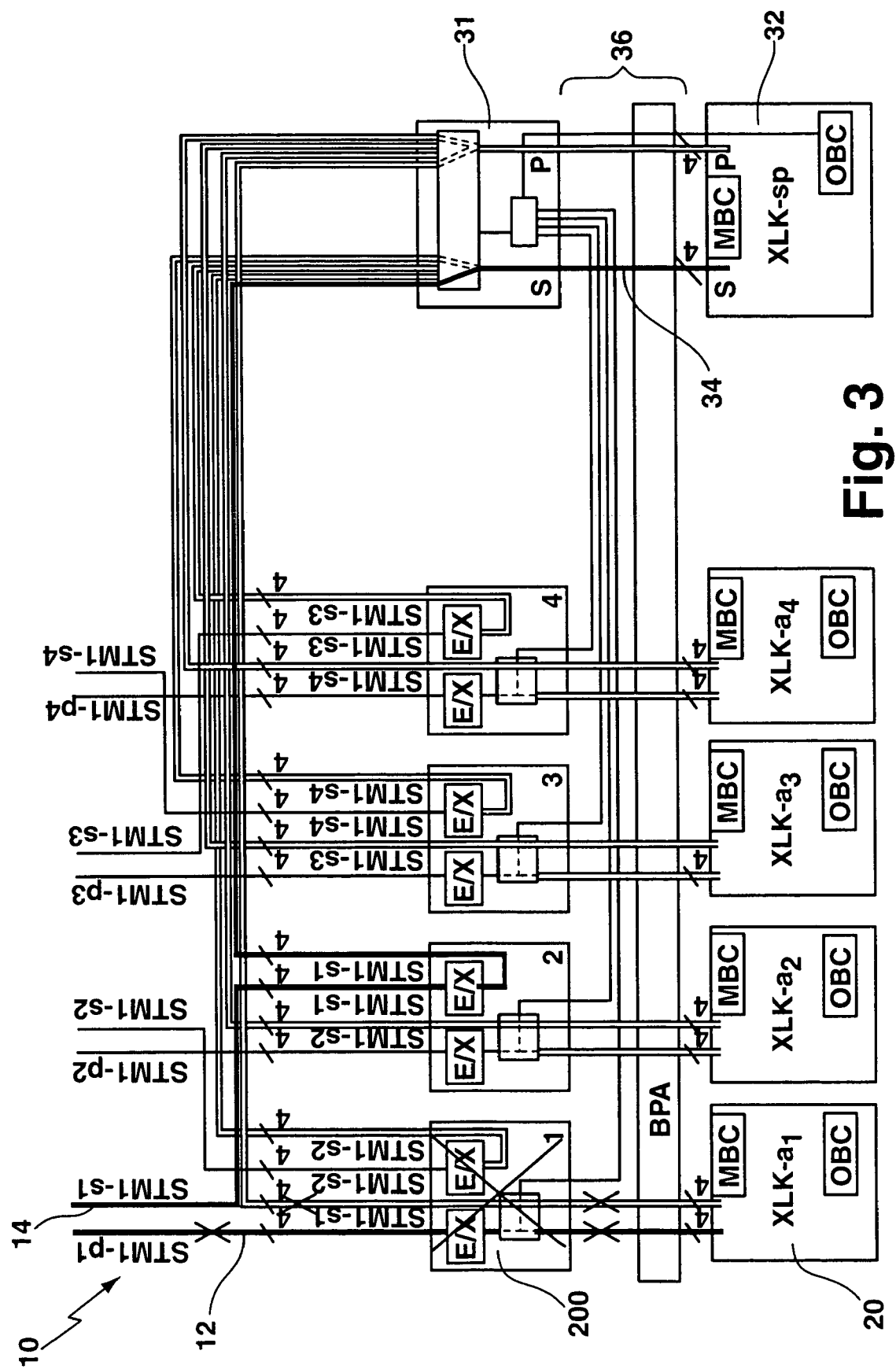
In FIG. 3 the protection routing of protection SDH signals in case of a failure of a SDH hardware interface is shown.

In FIG. 3 the signal routing in case of a failure of an applique (XLK-Applique) 200 is shown. This initiates an Automatic Protection Switch (APS) case and the payload of the failed applique is extracted at the XLK-sp applique from the protection SDH signal transmitted on the protection SDH link, which is forwarded to the protection applique. The SDH connections used to forward protection SDH signals of a SDH hardware interface in case a failure of the SDH hardware interface are shown as thick black lines.

The invention claimed is:

1. Telecommunication switch comprising:
a plurality of SDH hardware interfaces, each comprising working link connecting means, being designed to be connected to a working SDH link and protection link connecting means, being designed to be connected to a protection SDH link associated to the working SDH link of the SDH hardware interface, wherein to each of said SDH hardware interfaces a SDH termination module is connected, and an equipment protection arrangement, comprising a protection switching hardware module and a spare SDH termination module, wherein:
each of said SDH hardware interfaces is connected to said equipment protection arrangement by a first SDH connection and a second SDH connection, and the protection SDH link of a first SDH hardware interface of said SDH hardware interfaces is connected to a second SDH hardware interface of said SDH hardware interfaces, the second SDH hardware interface is being designed to forward protection SDH signals transmitted by said protection SDH link of said first SDH hardware interface to said equipment protection arrangement using its first SDH connection, said equipment protection arrangement is being designed to switch said protection SDH signals to said spare SDH termination module or the SDH termination module being connected to said first SDH hardware interface according to a protection switching control signal, said equipment protection arrangement is comprising a primary connecting link and a secondary connecting link, both connecting said protection switching hardware module and said spare SDH termination module, said equipment protection arrangement is being designed to forward said protection SDH signals from said protection switching hardware module to said spare SDH termination module using said secondary connecting link, said first SDH hardware interface is being designed to forward working SDH signals transmitted by said working SDH link of said first SDH hardware interface to said equipment protection arrangement, and said equipment protection arrangement is being designed to forward said working SDH signals from said protection switching hardware module to said spare SDH termination module using said primary connecting link.

2. The telecommunication switch according to claim 1, wherein said equipment protection arrangement is being designed to forward said protection SDH signals to said first SDH hardware interface using the second SDH connection of said first SDH hardware interface.

3. The telecommunication switch according to claim 1, wherein said protection switching hardware module is located in a rear position of said spare SDH termination module.

4. A telecommunication switch comprising:
a plurality of SDH hardware interfaces, each comprising working link connecting means, being designed to be connected to a working SDH link and protection link connecting means, being designed to be connected to a protection SDH link associated to the working SDH link of the SDH hardware interface, wherein to each of said SDH hardware interfaces a SDH termination module is connected, and an equipment protection arrangement, comprising a protection switching hardware module and a spare SDH termination module, wherein:
each of said SDH hardware interfaces is connected to said equipment protection arrangement by a first SDH connection and a second SDH connection, and the protection SDH link of a first SDH hardware interface of said SDH hardware interfaces is connected to a second SDH hardware interface of said SDH hardware interfaces,
the second SDH hardware interface is being designed to forward protection SDH signals transmitted by said protection SDH link of said first SDH hardware interface to said equipment protection arrangement using its first SDH connection,
said equipment protection arrangement is being designed to switch said protection SDH signals to said spare SDH termination module or the SDH termination module being connected to said first SDH hardware interface according to a protection switching control signal, and
said protection switching hardware module is comprising a signal converter connected to said SDH hardware interfaces by a protection control bus, said signal converter being designed to switch control signals exchanged by said protection switching hardware module and said SDH termination modules on said protection control bus.

5. The telecommunication switch according to claim 1, wherein said SDH termination modules connected to said SDH hardware interfaces are comprising electrical SDH termination modules and optical SDH termination modules.

* * * * *